(12) United States Patent
Puranik et al.

(10) Patent No.: US 9,888,397 B1
(45) Date of Patent: Feb. 6, 2018

(54) INTELLIGENT NETWORK ANALYTICS ARCHITECTURE

(71) Applicant: Verizon Patent and Licensing Inc., Arlington, VA (US)

(72) Inventors: Gagan Puranik, Basking Ridge, NJ (US); Sandhya Narayan, Saratoga, CA (US); Patricia R. Chang, San Ramon, CA (US); Dennis Lee Davidson, Carmel, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/268,285

(22) Filed: Sep. 16, 2016

(51) Int. Cl.
*H04W 24/04* (2009.01)
*H04L 12/26* (2006.01)
*H04L 12/24* (2006.01)

(52) U.S. Cl.
CPC ......... *H04W 24/04* (2013.01); *H04L 41/0672* (2013.01); *H04L 43/0823* (2013.01)

(58) Field of Classification Search
CPC ..... G06F 9/542; H04L 12/4641; H04W 24/04
See application file for complete search history.

(56) References Cited

U.S. PATENT DOCUMENTS

| 9,385,923 B2 * | 7/2016 | Himura | H04L 12/4641 |
| 2006/0015603 A1 * | 1/2006 | Jakobson | G06F 9/542 |
| | | | 709/223 |

* cited by examiner

*Primary Examiner* — Myron K Wyche

(57) ABSTRACT

Techniques described herein may be used to implement an intelligent network analytics architecture (INAA) capable of monitoring a network in real-time and detecting faults occurring in the network. The INAA may develop and implement solutions to the problems, and subsequently verify that the solutions actually fixed the problems. The INAA may cause the solutions to be implemented throughout the network (and not just at the source of the initial problem). The INAA may identify other aspects of the network that are likely to experience similar (though not the same) problems in the future, develop solutions to those problems, and implement the solutions throughout the network. The INAA may enable an operator to participate in this process by providing a complete explanation of, and proposed solution to, a particular problem, and enabling the operator to approve, prevent, modify, postpone, etc., the implementation of the solution.

20 Claims, 10 Drawing Sheets

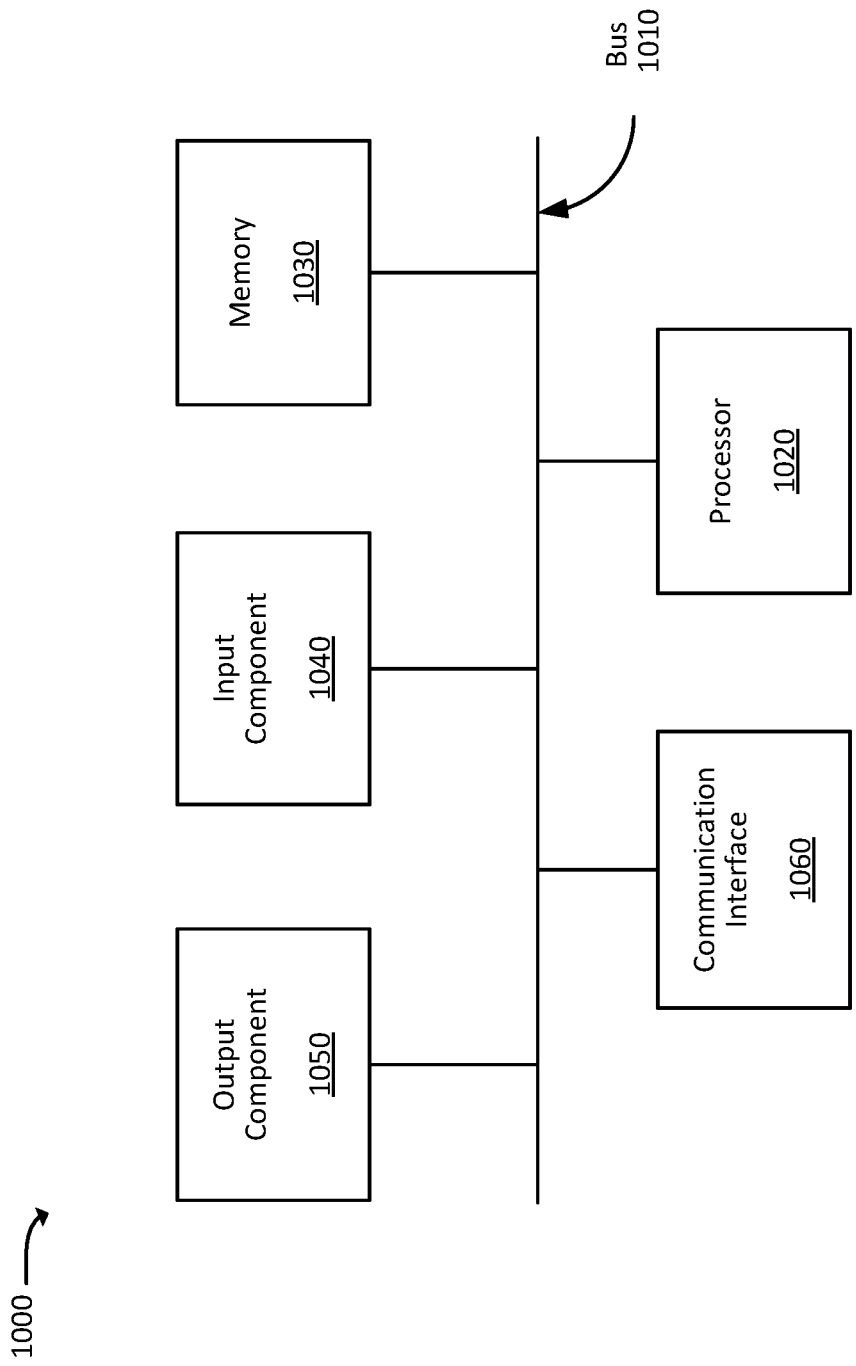

INTELLIGENT NETWORK ANALYTICS ARCHITECTURE

BACKGROUND

Operating a large network, such as a wireless telecommunication network, may include monitoring the network, identifying flaws within the network, and developing solutions to the flaws. For example, an operator of a network may receive periodic reports that indicate the operational conditions and status of the network. The reports may indicate that a problem is occurring in the network (e.g., an unusual number of User Equipment (UEs) being disconnected at a certain time and location within the network). In response, the operator may use software tools to manually analyze the situation and understand the nature of the problem. Once the problem is understood, the operator may then develop and implement a solution to the problem.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIG. 10 is a block diagram of example components of a device.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Operating a network, such as a wireless telecommunication network, may be a lengthy and labor-intensive process of identifying and solving problems that periodically occur within the network. For instance, an operator often must be notified of a problem in the network, analyze network conditions in order to understand the problem, develop a solution to the problem, and manually implement the solution to the problem. It is not uncommon for this to take several days. In addition, the solution is often applied to only one location in the network (e.g., a base station), which may leave other locations in the network vulnerable to the same problem. Furthermore, since there is rarely a feedback or record keeping policy for such situations, if/when the same problem occurs at another location in the network, a different operator may have to perform the same procedures of receiving a notification, analyzing network conditions, etc., in order to solve the same problem.

Techniques described herein may be used to implement an intelligent network analytics architecture (INAA) capable of monitoring a network in real-time and immediately detecting problems (also referred to herein as "faults") occurring in the network. In addition, the INAA may automatically develop and implement solutions to the problems, and subsequently verify that the solutions actually fixed the problem. Additionally, the INAA may cause the solutions to be implemented throughout the network (and not just at the source of the initial problem). Furthermore, the INAA may automatically identify other aspects of the network that are likely to experience similar (though not the exact same) problems in the future, develop solutions to those problems, and implement the solutions throughout the network. In some implementations, the INAA may enable an operator to participate in this process by providing a complete explanation of, and proposed solution to, a particular problem, and enabling the operator to approve, prevent, modify, postpone, etc., the implementation of the solution. Problems and solutions to problems may be used to update the INAA in order to enhance the INAA's ability to identify and solve subsequent problems in the network.

Figure 1:
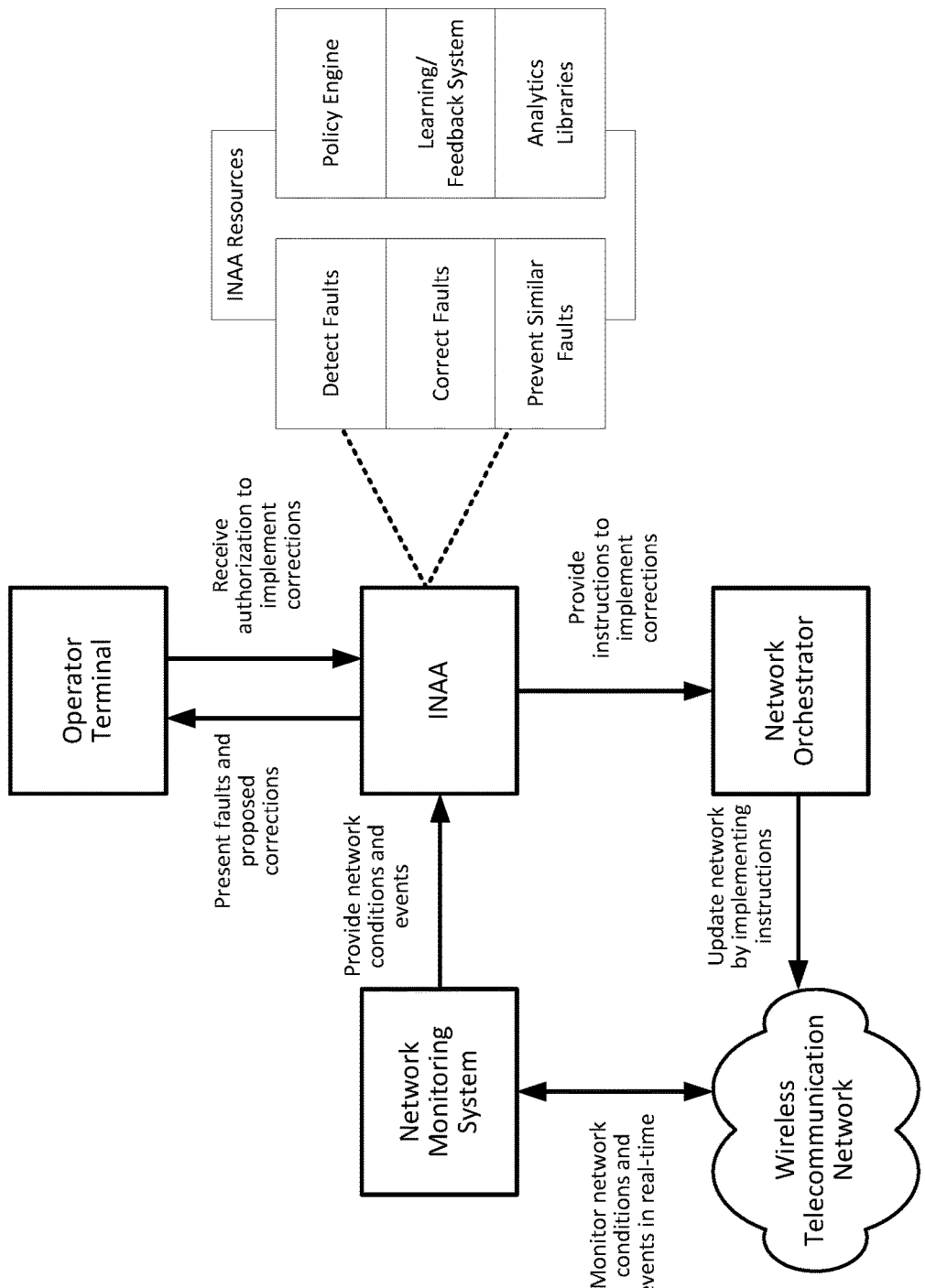
FIG. 1 illustrates an example overview of an implementation described herein.

FIG. 1 illustrates an example overview of an implementation described herein. As shown, a network monitoring system may monitor real-time conditions and events occurring in a wireless telecommunication network (e.g., network conditions, and changes to network condition, as they transpire within the network). The network monitoring system may provide an INAA with information regarding the monitored conditions and events, and the INAA may use the information to determine whether any faults are occurring in the network. If so, the INAA may develop corrections to the faults. Additionally, the INNA may identify other scenarios (e.g., devices) in the network that are likely to experience similar faults and develop solutions for those scenarios as well. The INAA may provide a description of the faults, the proposed corrections (and/or the similar faults and corresponding corrections) to an operator for consideration (e.g., approval, disapproval, modification, etc.). In response to receiving approval to implement the corrections, the INAA may provide a network orchestrator with instructions to implement the corrections developed by the INAA. Upon receiving the instructions, the network orchestrator may update the network to implement the corrections developed by the INAA.

As shown, the INAA may include a policy engine, a learning/feedback system, and an analytics library to better enable the INAA to detect faults, determine appropriate corrections, and prevent similar faults from occurring. The policy engine may include rules about how the network is to be configured and/or how the network should operate. The learning/feedback system may include a constantly up-to-date model that represents typical operating conditions within the network (e.g., number of sessions, throughput, network congestion, etc.). The analytics library may include an open-source, machine learning repository of analytical tools and instructions for detecting actual faults, identifying potential faults, and developing corrections to actual and potential faults. For example, the analytics library may include instructions on how to compare real-time network information to models and network policies in order to determine whether an actual fault as occurred and whether similar faults exist in the network. The analytics library may also include tools for determining how to modify the network in order to remedy an actual or potential fault, tools for determining whether a particular correction is feasible, tools for determining whether a particular correction would be effective, etc.

Figure 2:
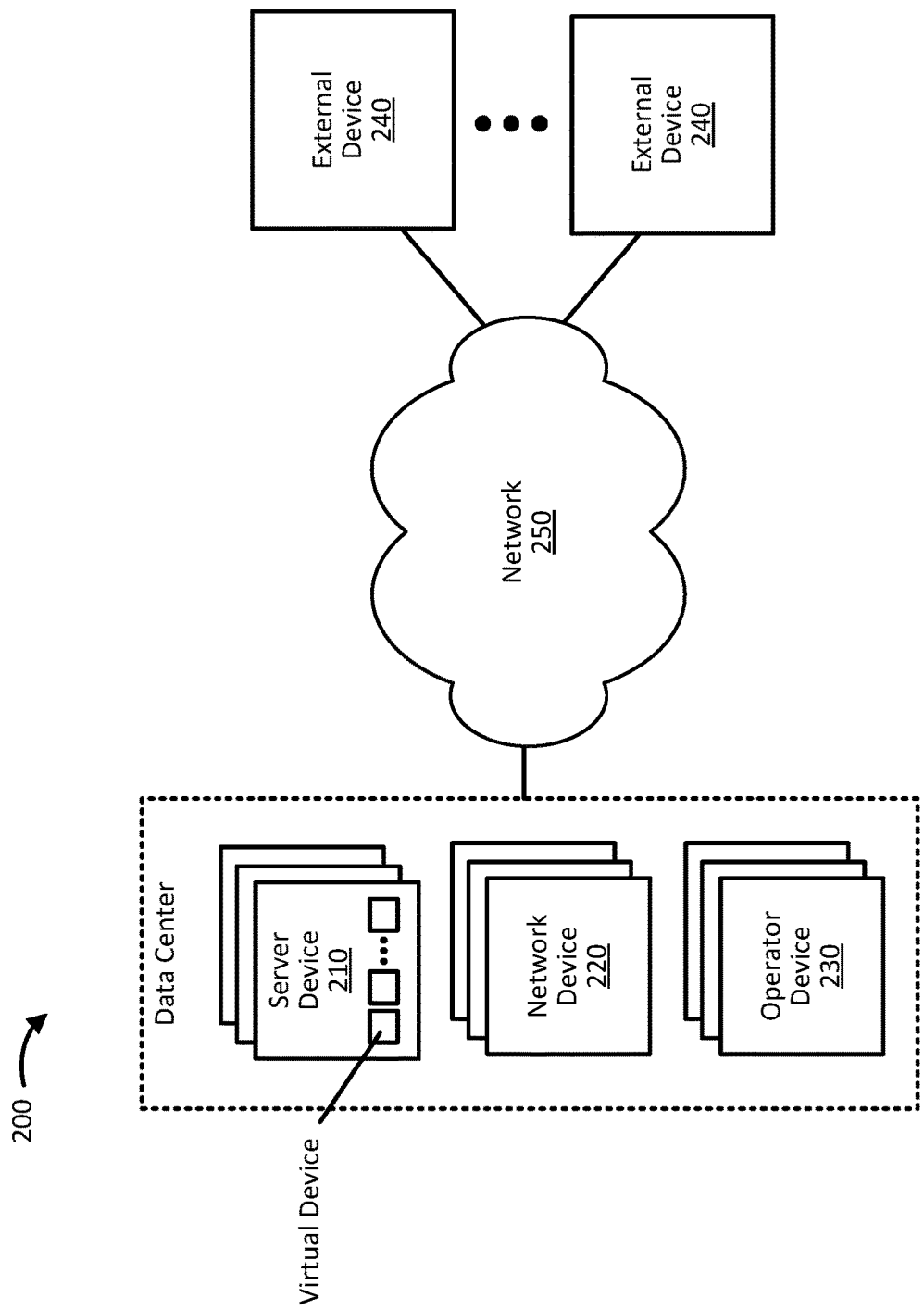
FIG. 2 is a diagram of an example environment in which systems and/or methods described herein may be implemented.

FIG. 2 is a diagram of an example environment 200 in which systems and/or methods described herein may be implemented. Environment 200 may include a data center that includes one or more server devices 210, network devices 220, and operator devices 230, in addition to external devices 240 and network 250.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another device of environment 200. Additionally, the devices of environment 200 may interconnect with each other, and/or other devices, via wired connections, wireless connections, or a combination of wired and wireless connections. In some implementations, one or more devices of environment 200 may be physically integrated in, and/or may be physically attached to, one or more other devices of environment 200. Also, while "direct" connections are shown in FIG. 2 between certain devices, some devices may communicate with each other via one or more additional devices and/or networks.

Server device 210 may include one or more computing devices, such as a server device or a collection of server devices, capable of operating in a cloud computing environment. For example, server device 210 may include a computing device with an operating system and/or other software that enables server device 210 to create and configure virtual devices, which may be arranged in different ways and configured to provide different services. A virtual device (also referred to herein as a virtual network function (VNF)) may include a software function that is hosted by server device 210 and that operates in a manner that simulates a physical computing device (e.g., a server device, a user device, a network device, etc.). In some implementations, virtual devices may be part of a virtual network.

Network device 220 may include one or more devices that facilitate or enable communications between various devices shown in environment 200 (e.g., server devices 210 and operator devices 220). Examples of network device 220 may include routers, modems, gateways, switches, hubs, etc. Network devices 220 may be arranged and configured to interconnect the server devices 210 and operator devices 220 in one or more ways, in addition to providing a connection between the data center and network 250.

Operator device 230 may include a computing and communication terminal. In some implementations, operator device 230 may include a portable device, such as a smart phone, a laptop computer, a tablet computer, etc. Operator device 230 may also include non-portable computing devices, such as a desktop computer, a consumer or business appliance, or other devices that have the ability to connect to network 250. Operator device 230 may also include a computing and communication device that may be worn by a user (also referred to as wearable devices) as a watch, a fitness band, a necklace, glasses, an eyeglass, a ring, a belt, a headset, or another type of wearable device.

Operator device 230 may receive information from one or more server devices 210 (and/or virtual devices) and my present the information to an operator. Examples of the information may include an indication of a fault detected in a virtual network hosted by server devices 210 and a proposed correction corresponding to the fault. Operator device 230 may receive an input from the operator regarding the fault and proposed correction. For instance, the operator may input information that validates the fault (e.g., as an actual fault), that modifies the proposed correction in a particular way, that grants permission to implement the proposed correction, etc.

External devices 240 may include one or more computing and communication device capable of communicating with the data center via network 240. In some implementations, the external devices 240 may include remote operator devices that may enable operators to interact with the devices in the data center. In some implementations, external devices may include a network device (e.g., a base station) that is in communication with a virtual network (e.g., a virtual core network) implemented by VNFs of server devices 210, an example of which is discussed in more detail below with reference to FIG. 3.

Network 250 may include one or more wired and/or wireless networks. For example, network 250 may include a cellular network (e.g., a second generation (2G) network, a third generation (3G) network, a fourth generation (4G) network, a fifth generation (5G) network, a Long-Term Evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

Figure 3:
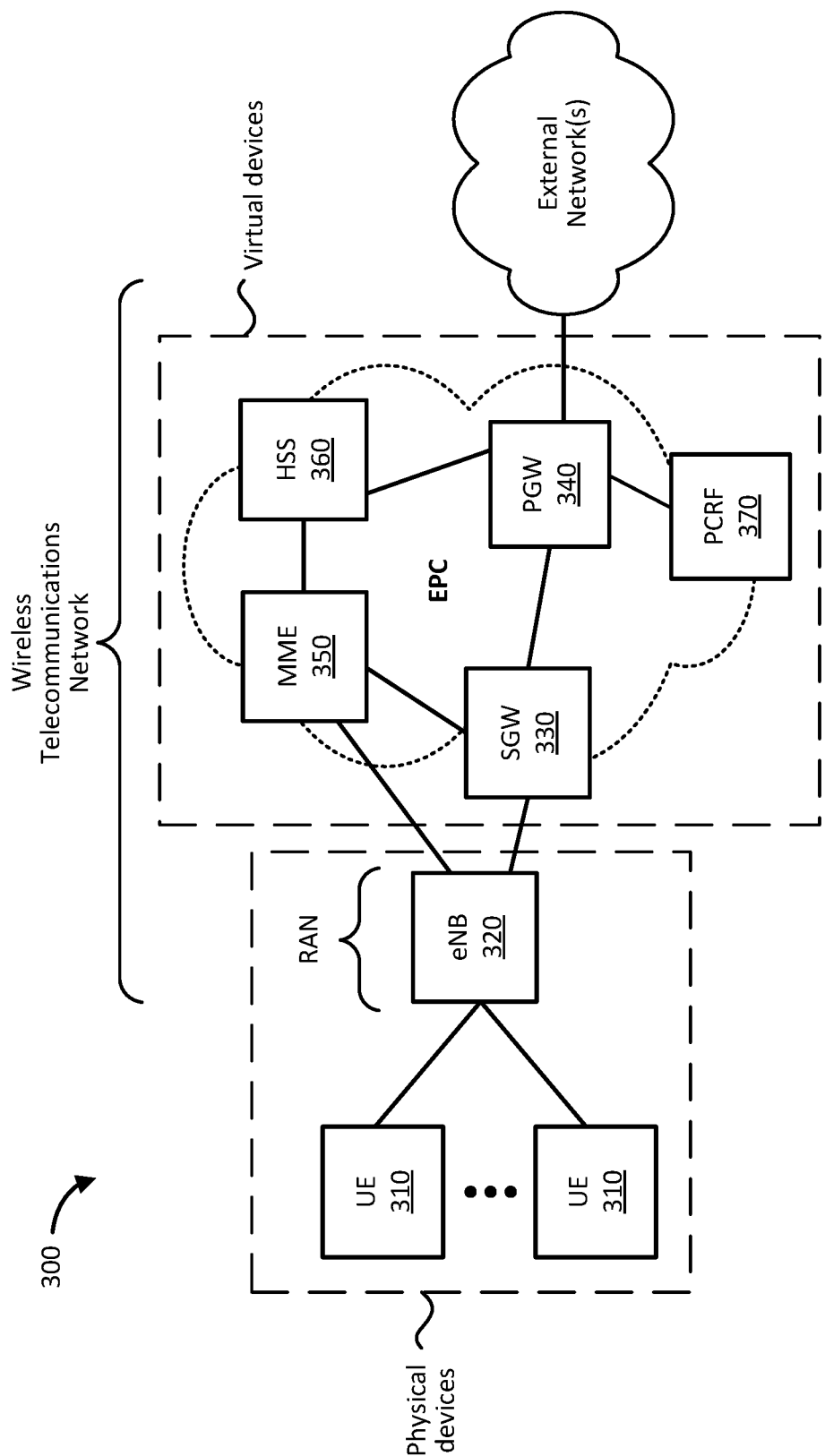
FIG. 3 is a diagram of an example network in which systems and/or methods described herein may be implemented.

FIG. 3 is a diagram of an example network 300 in which systems and/or methods described herein may be implemented. Some of the devices depicted in FIG. 3 may be implemented as physical devices (e.g., external devices 240 of FIG. 2) and other devices may be implemented as virtual devices (e.g., of server devices 210 of FIG. 2). For instance, UEs 310 and eNB 320 may be implemented by physical device, while SGW 330, PGW 340, MME 350, etc., may be implemented as virtual devices. In some implementations, eNB 320 may also be virtualized in one or more ways.

As shown in FIG. 3, example network 300 may include UEs 310, a wireless telecommunications network, and external networks. The wireless telecommunications network may include an Evolved Packet System (EPS) that includes an LTE network and/or an evolved packet core (EPC) network that operates based on a 3rd Generation Partnership Project (3GPP) wireless communication standard. The LTE network may be, or may include, radio access networks (RANs) that include one or more base stations, some or all of which may take the form of enhanced node Bs (eNBs) 320, via which UEs 310 may communicate with the EPC network.

The EPC network may include Serving Gateway (SGW) 330, PDN Gateway (PGW) 340, Mobility Management Entity (MME) 350, Home Subscriber Server (HSS) 360, and/or Policy and Charging Rules Function (PCRF) 370. Some of the devices depicted in FIG. 3 may be implemented as VNFs hosted by one or more server devices 210. The EPC network may enable UEs 310 to communicate with an external network, such as a PLMN, a PSTN, and/or an IP network (e.g., the Internet).

UE 310 may include a portable computing and communication device, such as a personal digital assistant (PDA), a smart phone, a cellular phone, a laptop computer with connectivity to the wireless telecommunications network, a tablet computer, etc. UE 310 may also include a non-portable computing device, such as a desktop computer, a consumer or business appliance, or another device that has the ability to connect to a RAN of the wireless telecommunications network. UE 310 may also include a computing and communication device that may be worn by a user (also referred to as a wearable device) such as a watch, a fitness band, a necklace, glasses, an eyeglass, a ring, a belt, a headset, or another type of wearable device. UE 310 may be capable of downloading, installing, and/or executing apps, which may be available from a server (or another type of network device) operating as a virtual store, an application library or repository, or another type of service from which UE 310 may obtain apps. In some implementation, an app installed on UE 310 may cause UE 310 to communicate with one or more network devices.

eNB 320 may include one or more network devices that receives, processes, and/or transmits traffic destined for and/or received from user device 310 (e.g., via an air interface). eNB 320 may be connected to a network device, such as site router, that functions as an intermediary for information communicated between eNB 320 and the EPC. In some implementations, eNB 320 may be disaggregated and virtualized in one or more ways, such as by a combination of a remote radio head (RRH) and a virtual baseband unit (vBBU).

SGW 330 may aggregate traffic received from one or more eNBs 320 and may send the aggregated traffic to an external network or device via PGW 340. Additionally, SGW 330 may aggregate traffic received from one or more PGWs 360 and may send the aggregated traffic to one or more eNBs 330. SGW 330 may operate as an anchor for the user plane during inter-eNB handovers and as an anchor for mobility between different telecommunication networks. PGW 340 may include one or more network devices that may aggregate traffic received from one or more SGWs 330, and may send the aggregated traffic to an external network. PGW 340 may also, or alternatively, receive traffic from the external network and may send the traffic toward user device 310 (via SGW 330 and/or eNB 320).

MME 350 may include one or more computation and communication devices that act as a control node for eNB 320 and/or other devices that provide the air interface for the wireless telecommunications network. For example, MME 350 may perform operations to register user device 310 with the wireless telecommunications network, to establish bearer channels (e.g., traffic flows) associated with a session with user device 310, to hand off user device 310 to a different eNB, MME, or another network, and/or to perform other operations. MME 350 may perform policing operations on traffic destined for and/or received from user device 310.

HSS 360 may include one or more devices that may manage, update, and/or store, in a memory associated with HSS 360, profile information associated with a subscriber (e.g., a subscriber associated with user device 310). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with user device 310. Additionally, or alternatively, HSS 360 may perform authentication, authorization, and/or accounting operations associated with the subscriber and/or a communication session with user device 310.

PCRF 370 may receive information regarding policies and/or subscriptions from one or more sources, such as subscriber databases and/or from one or more users. PCRF 370 may provide these policies to PGW 340 or another device so that the policies can be enforced. As depicted, in some implementations, PCRF 370 may communicate with PGW 340 to ensure that charging policies are properly applied to locally routed sessions within the telecommunications network. For instance, after a locally routed session is terminated, PGW 340 may collect charging information regarding the session and provide the charging information to PCRF 370 for enforcement.

Figure 4:
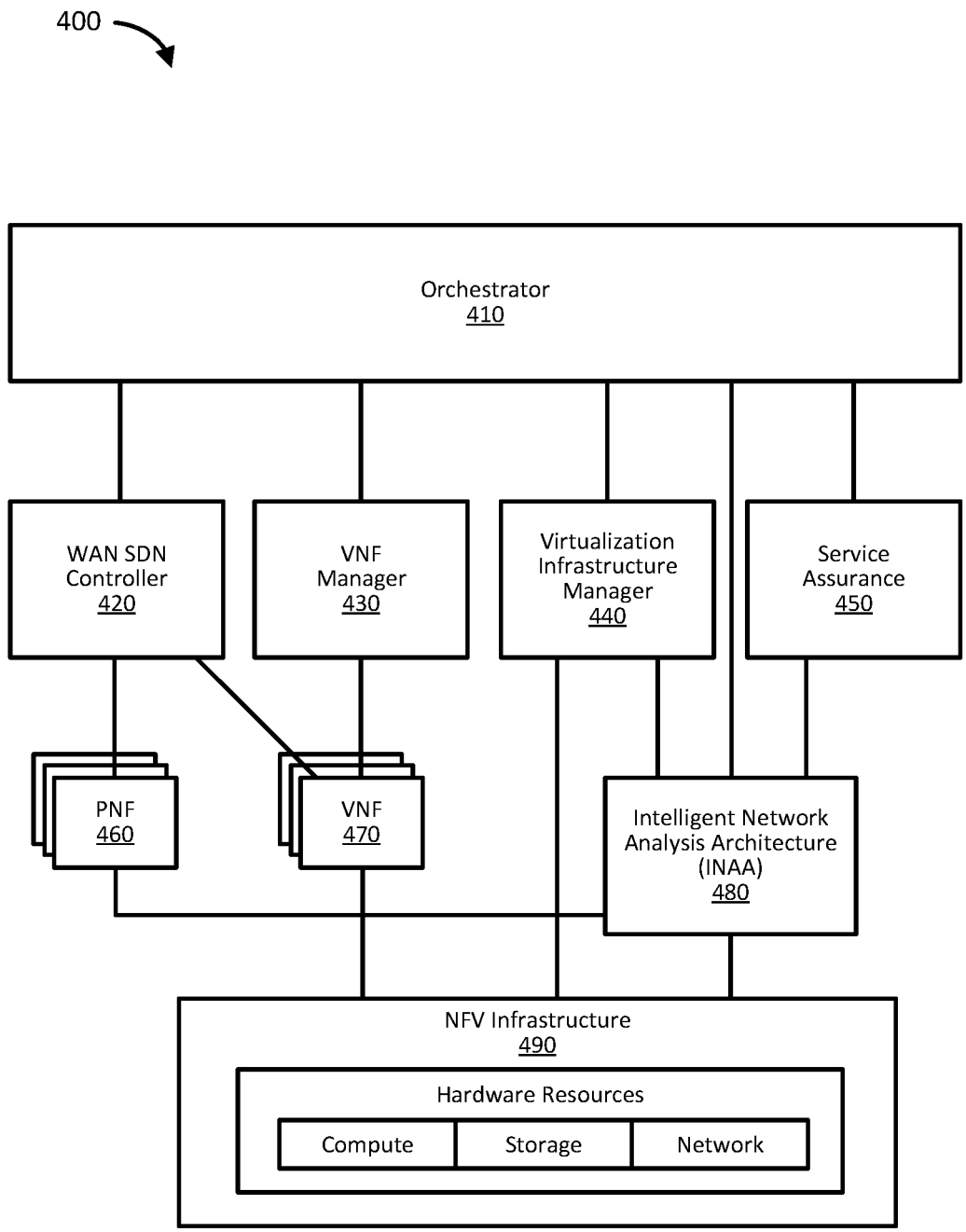
FIG. 4 is a diagram of an example of a virtual network.

FIG. 4 is a diagram of an example of a virtual network 400. One or more of the components of virtual network 400 may be implemented as virtual devices or functions of server devices 210. Examples of such devices may include the EPC of FIG. 3. Additionally, virtual network 400 may interact with physical devices, represented in FIG. 2 as external devices 240, in FIG. 3 as eNB 320, and in FIG. 4 as physical network functions (PNFs) 460).

As shown, virtual network 400 may include orchestrator 410, WAN software defined network (WAN SDN) controller 420, VNF manager 430, virtualization infrastructure manager 440, service assurance 450, physical network functions (PNFs) 460, virtual network functions 470, intelligent network analysis architecture (INAA) 480, and network function virtualization (NFV) infrastructure (NFVI) 490. Virtual network 400 may include a combination of virtualized functions (block 410-450 and 470-490) and physical devices (also referred to as PNFs 260). In some implementations, the virtual functions may be implemented on one or more server devices 210 of a data center, while PNFs 260 may be implemented by one or more external devices 240 (such as eNB 320).

Orchestrator 410 may be responsible for allocating, instantiating, and activating network functions throughout virtual network 400. WAN SDN controller 420 may be responsible for control connectivity services in a WAN operated by example network 400. VNF manager 430 may be responsible for VNF lifecycle management, which may include instantiation of VNFs, upgrading VNFs, scaling for VNFs, terminating VNFs, etc. Virtualization infrastructure manager 440 may be responsible for allocating physical resources (e.g., processing capacity, memory capacity, storage capacity, etc.) to the implementation of the virtualized functions of example network 400. In some implementations, the physical resources managed by virtualization infrastructure manager 440 may include the physical resources of one or more server devices 210 of a data center.

Service assurance 450 may be responsible for collecting and monitoring data, which may include events, conditions, messages, performance levels, etc., of virtual network 400. The collected data may be used by one or more virtual functions of network 400. For example, as described in detail with reference to FIGS. 6-8, the information collected and monitored by service assurance 450 may enable INAA 480 to determine faults within the network, determine appropriate corrections for the faults in the network, etc. PNF 460 may include a network function that may rely on dedicated hardware and software for part of its functionality. In some implementations, PNFs 460, such as PNFs that correspond to eNBs, may be controlled by WAN SDNs 420 (as shown); however, other types of PNFs may be controlled by other types of devices and/or functions. In some implementations, PNF 460 may include a base station (such as eNB 320) or another type of device through which UEs may connect to example network 400. In some implementations, data from PNFs may be inputs to INAA 480.

VNFs 470 may include a software implementation of a network device (and/or a function of a network device). Examples of VNFs 470 may include one or more devices of an EPC, such as SGW 330, PGW 340, MME 350, etc. INAA 480 may be responsible for identifying faults occurring within network 400, determining appropriate corrections to the faults, implementing the correction in order to remedy the fault, and more. In some implementations, INAA 480 may receive information about the desired state of the network (e.g., information about how the network is intended to functions). Doing so may, for example, enable INAA 480 to compare the actual or monitored state of the network with the desired state of the network, in order to develop ways (e.g., rules, policies, configurations, etc.) to improve the actual state of the network. Detailed examples of such operations are discussed below with reference to FIGS. 6-8. NFVI 490 may include hardware (e.g., processors, memory, storage capacity, etc.) and software components (e.g., an operating system, applications for creating and managing VNFs, etc.) upon which the virtual functions of network 400 are deployed.

The quantity of physical and virtual components, illustrated in FIG. 4, is provided for explanatory purposes only. In practice, network 400 may include additional components, fewer components, different components, or differently arranged components than illustrated in FIG. 4. Alternatively, or additionally, one or more of the components of network 400 may perform one or more functions described as being performed by another component of network 400. In some implementations, one or more components of network 400 may be physically (or virtually) integrated in, and/or may be physically (or virtually) attached to, one or more other components of network 400. Also, while "direct" connections are shown in FIG. 4 between certain components, some components may communicate with each other via one or more additional components.

Figure 5:
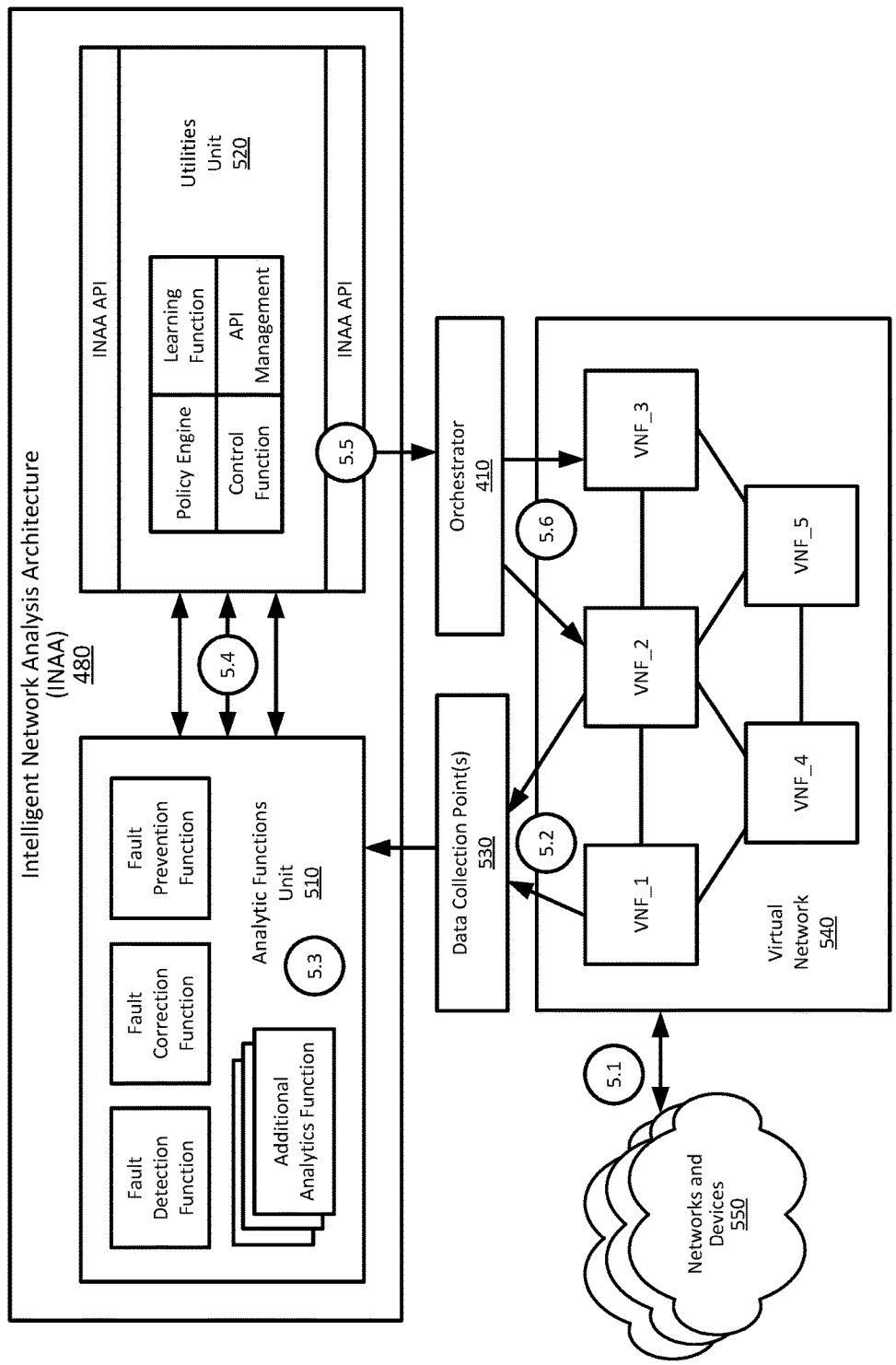
FIG. 5 is a diagram of an example implementation for detecting and correcting faults within a virtual network.

FIG. 5 is a diagram of an example implementation for detecting and correcting faults within a virtual network. The networks and components depicted in FIG. 5 may be implemented by VNFs hosted by one or more server devices 210.

As shown, networks and/or devices may communicate with one or more VNFs (e.g., VNF_1, VNF_2, etc.) of virtual network 540 (at 5.1). For example, the networks and/or devices may include an LTE RAN that includes an eNB capable of communicating with virtual network 540 as though the VNFs of the virtual network were legacy EPC devices (e.g., an SGW, an MME, etc.). Information corresponding to such network activity may be collected as one or more data collections points 530 (e.g., as defined by service assurance 450) (at 5.2), and the data collection points 530 may be provided to analytic functions unit 510 (at 5.3). In some implementations, the data collection points may include a stream of real-time data from virtual network 540.

A fault detection function may analyze the information to determine whether any faults are occurring within virtual network 540. In doing so, the fault detection function may communicate with the policy engine of utility unit 520 (at 5.4) in order to obtain policies that may be relevant to properly analyzing the information from the virtual network (at 5.4). The policies may include rules and standards that describe the manner in which the virtual network should be configured and/or should operate. Additionally, or alternatively, the fault detection function may communicate with the learning function of utility unit 520 to obtain examples of previously identified faults, a model that describes typical operating conditions of virtual network 540, etc. In some implementations, the learning function may include machine learning libraries, such as TensorFlow, DL4j (Deep Learning for Java), Caffe, etc.

If/when a fault is identified, a fault correction function may analyze the fault to determine an appropriate correction for the fault. Similar to the fault detection function, fault correction function may obtain policies, examples, and/or models from the policy engine and the learning function of utilities unit 520. Once an appropriate correction is determined, analytic functions unit 510 may notify utilities unit 520 about the correction, and the control function and API management unit may operate to provide orchestrator 410 with instructions to implement the correction (at 5.5). In accordance with the instructions, orchestrator 510 may cause the appropriate VNFs (e.g., VNF_2 and VNF_3) to be updated in order to eliminate the fault. In some implementations, corrections may also, or alternatively, be applied to be applied to radio network components (or other PNFs), such as eNB 320.

In some implementations, the fault prevention function of analytics unit 510 may analyze the information received from virtual network 540 and the fault detected by fault detection function in order to determine whether their other conditions in virtual network 540 may give rise to other faults. The fault prevention function may also determine an appropriate correction for the other faults, which may include an analysis of the correction for the initial fault since (for example) the corrections may be similar given the similarity between the initial fault and the other faults. In such a scenario, analytic functions unit 510, utilities unit 520, etc., may operate to implement the corrections in a manner that is similar to the way in which the initial fault was corrected. In some implementations, additional analytic functions may be used to identify a fault in the virtual network determine an appropriate correction for the fault, identify other (or potential) faults within virtual network 540, and determine corrections for said potential faults. Examples of additional analytic functions may include simulation functions that enable analytic function unit 510 to simulate whether a particular correction will be effective at remedying a particular fault, whether a particular correction will create other faults in a network, etc.

Figure 6:
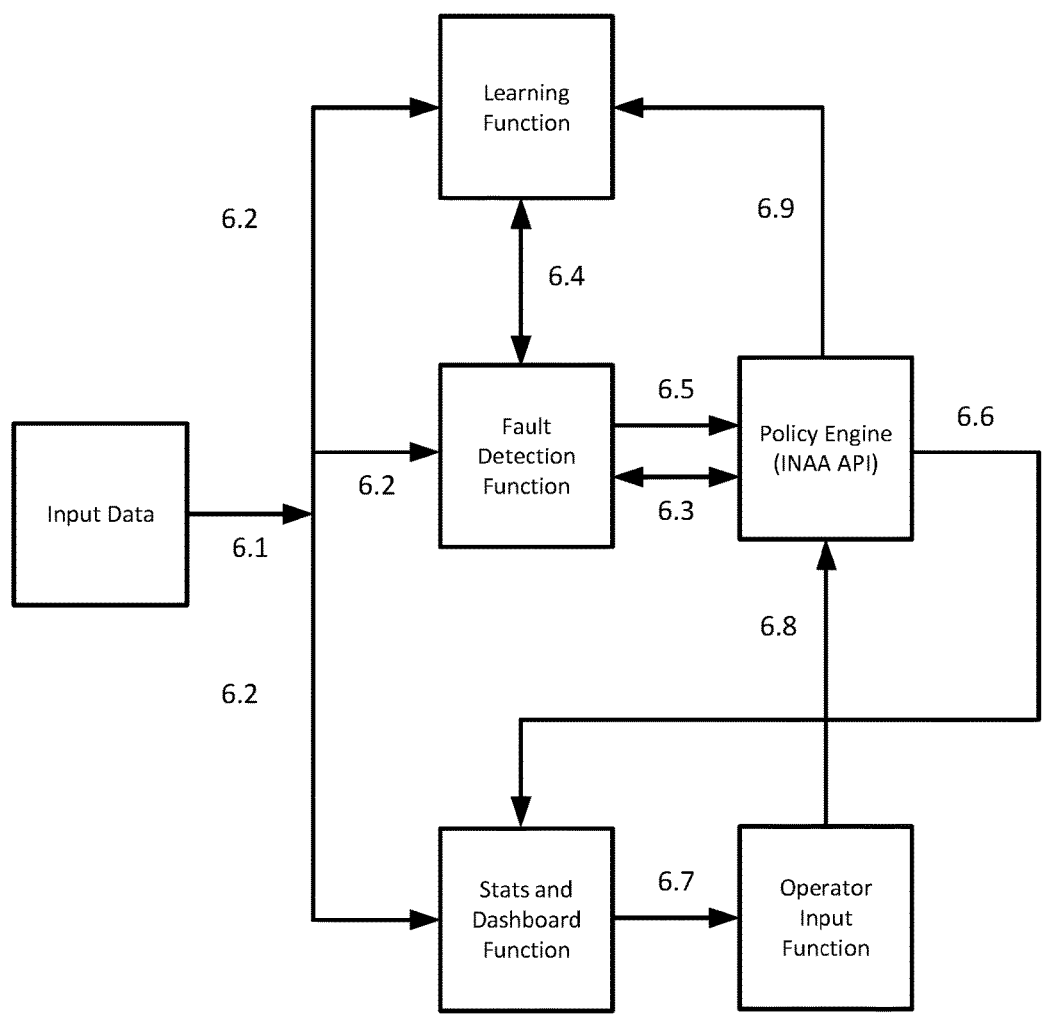
FIG. 6 is a diagram of an example technique for intelligent fault detection within a network.

FIG. 6 is a diagram of an example technique for intelligent fault detection within a network. The example of FIG. 6 may be implemented by INAA 480.

As shown, INAA 480 may receive input data corresponding to a particular network (at 6.1). Examples of such information may pertain to particular events, conditions, messages, performance levels, etc., of a network, network device, and/or or function (e.g., VNF) of the network. Additionally, or alternatively, the input data may include network topology information, network configuration data, information describing the overall status of the network, etc. In some implementations, the input data may include an alert indicating that a particular event or condition as occurred within the network. The alert may correspond to a pre-selected threshold (e.g., a number of calls being dropped during a specified period of time) being reached or exceeded. In some implementations, the input data may include real-time information, such as current conditions of the network.

INAA 480 may apply the input data to a fault detection function, a learning function, and/or a stats and dashboard function (at 6.2). The fault detection function may analyze the input data and determine whether a fault has actually occurred within the network. A fault, as described herein, may include an unacceptable or anomalous event, condition, performance level, etc., within the network. For instance, a fault may include an unacceptably high number of dropped calls within a given period of time, a number of concurrent UE sessions for a particular RAN being unacceptably high, etc.

As shown, the fault detection function may communicate with the policy engine (at 6.3) and/or the learning function (at 6.4) in order to determine whether a fault has actually occurred within the network. For example, the fault detection function may provide some or all of the input data to the policy engine, and the policy engine may return one or more policies that are applicable to the input data. In some implementations, the fault detection function may analyze the input data to identify one or more issues or aspects of concern (e.g., UE attachment procedures, connection status issues, quality of service (QoS) issues, dropped calls, etc.,) and may provide the policy engine with the issues or aspects of concern. In response, the policy engine may provide the fault detection function with the policies that relate to the issues identified. For example, if the input data includes a number of dropped calls over a period of time, the policy engine may return a network policy that describes an acceptable number of dropped calls within a period of time. The fault detection function may compare the input data to the policy provided in order to determine whether the actual number of dropped calls (per the input data) exceeds the policy describing an unacceptable number of dropped calls.

Additionally, or alternatively, the fault detection function may determine whether a fault has occurred by communicating with the learning function (at 6.4). For example, the learning function may receive the input data and compare the input data to examples of known (e.g., previously identified) faults within the network. When the input data describes a scenario within the network that is sufficiently close to a known fault, the learning function may notify the fault detection function, which may include providing the identified examples to the fault detection function. The fault detection function may compare the input data to the examples to determine whether a fault has actually occurred within the network. For example, if the input data describes a scenario where 200 calls have been dropped within an hour, and an example provided by the learning function describes a scenario where only 100 calls were dropped in an hour, the fault detection function may conclude that a fault has occurred within the network.

The fault detection function may notify the policy engine when a fault has occurred (at 6.5), and the policy engine may notify the stats and dashboard function about the fault via an INAA API (at 6.6). In some implementations, the notification may include an indication that a fault has occurred, the input data upon which the fault was identified, and/or the policy (and/or example) used to identify the fault. The stats and dashboard function may provide the information to an operator of the network, which may enable the operator to become aware of, and/or confirm, the fault detected within the network. In some implementations, the stats and dashboard function may also provide the operator some or all of the input data (received at 6.2). Doing so may provide the operator with a more complete picture of the network, which may provide the operator with insight into the fault notification and/or whether the fault is a false positive.

For example, the fault detection analytic function may have detected an internal failure within a particular eNB and an unacceptably high level of sessions occurring in a neighboring eNB, and the operator may be notified accordingly. While the notification presented to the operator may accurately indicate that two failures have occurred within the network, additional input data provided to the status and dashboard function may enable the operator to determine that the one eNB failing is the primary reason for the unacceptably high level of session occurring in the neighboring eNB. As such, the operator may provide input (via the stats and dashboard function) indicating the relationship between the two faults and/or that the unacceptably high level of sessions was a false positive in the sense that it was merely a result of another (e.g., a "real") fault.

The stats and dashboard function may provide the notification (e.g., the faults), additional input data, and/or the operator's input to the operator input function (at 6.7). The operator input function may analyze the information provided and generate update information that is sent to the policy engine (at 6.8). The update information may include new policies and/or modifications to existing policies that are based on the information received from the stats and dashboard function. For instance, continuing with the example of the eNB failure and the unacceptably high number of sessions occurring in the neighboring eNB, in response to the operator indicating that the fault regarding the unacceptably high number of sessions is merely a result of the eNB failure, the operator input function may update the policy regarding the unacceptably high number of session to include an exception that addresses neighboring eNB failures (such that, for example, an increase in the number of sessions in one eNB is not considered an actual failure when corresponding input data indicates that the increase was merely due to a neighboring eNB failing).

The policy engine may provide updated information (from the operator input function) to the learning function (at 6.9). In response, the learning function may create new, and/or modify existing, examples of faults based on the input data and the information received from the policy engine. For instance, the learning function that may create a record that describes the network conditions (e.g., the input data) pertaining to the fault and/or the policy violated by the network conditions. In some implementations, the learning function may also determine whether a change in policy and/or an operator input renders a pre-existing example of a fault invalid. For instance, if the learning function includes an example fault where a number of actual drop calls is 100 and a dropped call threshold is 75, but later receives an indication that a new dropped call policy has increased the threshold to 200, the learning function may delete the example fault that only includes 100 dropped calls since it may no longer be valid.

Figure 7:
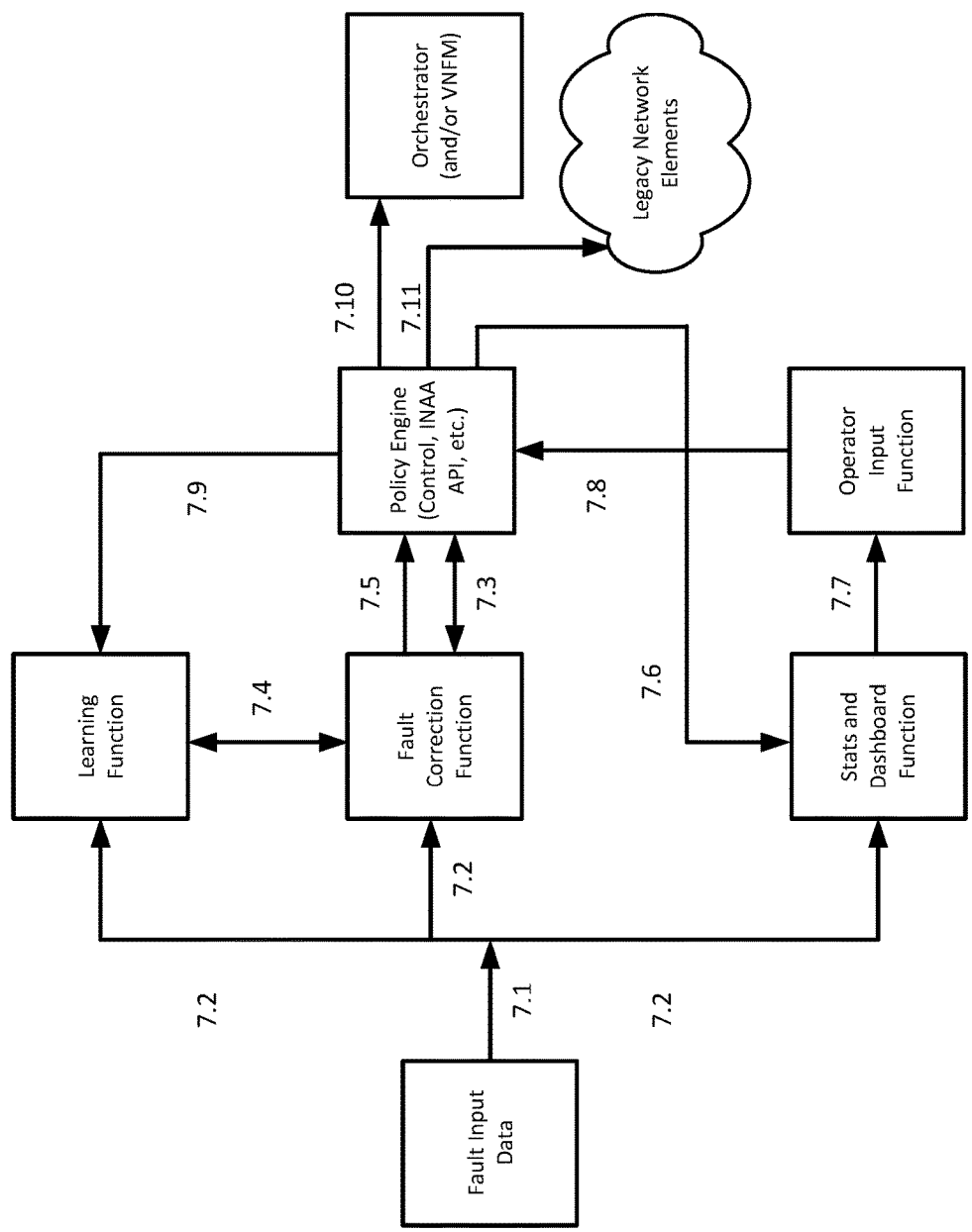
FIG. 7 is a diagram of an example technique for intelligent fault correction within a network.

FIG. 7 is a diagram of an example technique for intelligent fault correction within a network. The example technique of FIG. 7 may be implemented by INAA 480. In some implementation, the example technique may be implemented in response to a fault being detected in a network.

As shown, the example technique may include receiving input data corresponding to a particular fault within a network (at 7.1). Examples of such information may include a description of the fault and conditions relating to the fault. The information may include particular events, messages, performance levels, etc. of a network, device, and/or or function (e.g., VNF) corresponding to the fault. Additionally, or alternatively, the information may include network topology information, network configuration data, information describing the overall status of the network at and around the time of the fault, etc. In some implementations, the fault input data may include real-time (or near-real-time) information, such as current conditions of the network, events that have occurred since the time of the fault, etc. In some implementations, the fault input data may include polies or rules that were used to identify the fault.

The input data by be provided to the fault correction function, a learning function, and/or a stats and dashboard function (at 7.2). The fault correction function may analyze the input data and determine an appropriate correction for the fault. Examples of a correction to a fault may include changing resources (e.g., processor capacity, bandwidth capacity, memory capacity, a number of VNFs, etc.) allocated to a particular device or function of the network. Additional examples of a correction may include altering the configuration of one or more network devices, functions, or interfaces within the network. For instance, if a fault includes an unacceptably high number of sessions between UEs and a particular eNB, the correction may include altering appropriate configuration parameters for the eNB to increase the likelihood that some of the UEs are promptly handed off to neighboring eNBs.

As shown, the fault correction function may communicate with the policy engine (at 7.3) and/or the learning function (at 7.4) in order to determine an appropriate correction for a given fault. In some implementations, the functionality of the policy engine and the learning function, with respect to fault correction, may be similar to the functionality of these functions with respect to fault detection (as discussed above with reference to FIG. 6). For instance, the fault correction function may analyze the fault input data in order to identify one or more characteristics of the fault, may provide the characteristics to the policy engine, and the policy engine may return policies that are relevant to determining an appropriate response (e.g., corrective measure) to the fault.

Examples of such characteristics may include a fault duration (e.g., temporary fault, an indefinite fault, etc.) and an aspect of the network to which the fault corresponds (e.g., a device, an interface, a function, etc.). Additionally, or alternatively, examples of such characteristics may include a severity of the fault (e.g., whether the fault is critical to the network, an issue of mere inefficiency, etc.), a fault type (e.g., whether the fault likely pertains to a software issue, a hardware issue), etc. Additionally, policies that may be relevant to determining an appropriate correction to a fault may include information that describes how the network, a particular device within the network, and/or a particular function of the network is supposed to operate. Additionally, or alternatively, policies that may be relevant to determining an appropriate correction may include rules for how to analyze a particular fault in order to understand the fault (e.g., the source, nature, and impact of the fault), rules for identifying changes to the network that would likely have an effect on the fault, and rules for determining whether the change would be an effective solution to the fault (e.g., whether the change would actually remedy the fault).

Additional examples of relevant policies may include rules for determining whether a particular change to the network is feasible (e.g., by determining whether there are enough network resources to implement the change) and rules for determining whether a particular change would have any negative effects on the network (e.g., by determining whether the change would create other faults in the network). Examples of relevant policies may also, or alternatively, include rules for determining whether a particular change is worth implementing (e.g., by determining and weighting the forecasted benefits of the change (e.g., the amount and significance of improved network performance) against the cost of implementing the change (e.g., the amount of resources required to implement the change, the negative impact of any additional faults that may be created by implementing the change, etc.). Other relevant policies may include rules for comparing which potential change, from among several changes that are effective, feasible, etc., would be most advantageous to implement (e.g., by comparing the cost/benefit of one potential change to the cost/benefit of another potential change). The fault correction function may use the policies from the policy engine to determine an appropriate correction for the fault.

Additionally, or alternatively, the fault correction function may determine an appropriate correction for a particular fault by communicating with the learning function (at 7.4). For example, the learning function may receive some or all of the fault input data and compare the fault input data to examples of known (e.g., previously identified) faults and/or corrections. For instance, the learning function may analyze the fault input data to determine conditions and characteristics surrounding the fault, and compare the conditions and characteristics to those associated with known faults. Examples of such conditions and characteristics may include the configuration settings at the time of the fault, network conditions and performance levels preceding the fault, and the impact of the fault on the network), and identify example faults with similar condition and characteristics.

Upon identifying an example fault that is comparable to the fault input data, learning function may determine whether there are any corrections associated with the example fault (e.g., corrections that were implemented in the network in response to the fault represented by the example fault). Additionally, the learning function may provide the example fault and correction to the fault correction function, and the fault correction function may use the example fault and correction in determining an appropriate correction for the fault at hand (i.e., the fault represented by the fault input data). For example, the fault correction function may determine whether the fault input data is sufficiently similar to the example faults to use, or incorporate some aspect of, the example correction in the correction for the fault input data.

For instance, assume that the example fault and correction described a scenario where a particular base station consistently experienced an unacceptably high volume of dropped calls during a particular time of day (e.g., over 200 dropped between the hours of 9:00 AM and 10:00 AM), which was remedied by increasing (by a modest percent) certain network resources allocated to that base station during those times. If the fault input data describes an analogous scenario (e.g., where another base station consistently experiences 150 dropped calls between the hours of 5:00 PM and 6:30 PM), the fault correction function may determine that an appropriate correction includes increasing the network resources for the base station (described by the fault input data) in a manner that is similar to the example correction provided by the learning function. In some implementations, the manner in which the example faults, example corrections, and fault input data is analyzed by the fault correction function may be based on, or similar to, one more of the policies and rules discussed above with reference to the policy engine.

The fault detection function may notify the policy engine when an appropriate correction has been determined (at 7.5), and the policy engine may notify the stats and dashboard function about the correction via an INAA API (at 7.6). In some implementations, the notification may include a description of the fault and the correction for the fault. The notification may also include the fault input data that was relevant to determining the correction, the policies used to determine the correction, and/or the examples used to determine the correction. The stats and dashboard function may provide the information to an operator of the network, which may enable the operator to become aware of, and/or confirm, the correction being proposed by the fault correction function. Doing so may provide the operator with a more complete picture of the network, which may provide the operator with insight into whether the proposed correction is a suitable remedy for the fault, determine whether the correction will create other faults in the network, whether the correction is worth implementing, etc. For instance, the operator may be aware of certain network conditions (repair work, installations, reinstallations, troubleshoot efforts, etc.) that would be adversely affected by implementing the correction, that would make implementing the correction impossible or inadvisable, etc. As such, notifying, and/or obtaining approval from, the operator regarding a proposed correction may help ensure that corrections are implemented appropriately.

In some implementations, the stats and dashboard function may provide the fault input data, information describing the fault and proposed correction, and/or the operator's input to the operator input function (at 7.7). The operator input function may analyze the information provided and generate update information that is sent to the policy engine (at 7.8). The policy engine may determine, based on the update information, whether to create new policies, whether to delete existing policies, and whether modify existing policies. For instance, continuing with the example of the correction that involves reducing the number of calls dropped by an eNB by increasing the network resource that are available to the eNB, operator input function may create, or update, a policy that includes a rule or recommend regarding the ratio of network resources that are to be allocated to eNBs during certain network conditions (e.g., scenarios where eNBs are dropping an unacceptably large number of calls).

The policy engine may provide the update information to the learning function (at 7.9). In response, the learning function may create new, and/or modify existing, examples of corrections based on the fault input data and the update information received from the policy engine. For instance, the learning function that may create a model that represents the correction proposed by the fault correction function and/or validated by the operator. The learning function may associate the correction to the fault described by the fault input data (which may be a fault previously determined by the fault determination analytics function and stored by the learning function.

In some implementations, the learning function may also determine whether a change in policy and/or an operator input renders a pre-existing model of a fault and/or correction invalid. For instance, if the learning function includes an example of increasing network resource allocated to an eNB by 10% when the eNB experiences 120 dropped calls in an hour, but later receives an indication that a new dropped call policy has increased the acceptability threshold from 100 to 200 dropped calls per hour, the learning function may delete the example fault and correction since it may no longer be valid. Alternatively, the learning function may decommission, but retain a copy of, the example fault and correction in case the decommissioned example again becomes relevant (e.g., if the policy reverts back from 200 to 100 dropped calls per hour).

Additionally, the policy engine may cause the correction to be implemented. For instance, if the source of the fault corresponds to a function in a virtual network, the policy engine may provide the instructions to an orchestrator of a virtual network (at 7.10). If the source of the fault corresponds to a physical network device (e.g., SGW, PGW, MME, HSS, etc., represented in FIG. 7 by "Legacy Network Elements") the policy engine may provide the instructions to the device/network that is the source of the fault (at 7.11). Additionally, the policy engine may determine whether the correction should be applied throughout the network (e.g., to devices in similar circumstances as the device corresponding to the fault). If so, the policy engine may determine the devices and functions that should implement the correction and may provide instructions, to the appropriate devices and functions, in order to have the correction implemented throughout the network.

Figure 8:
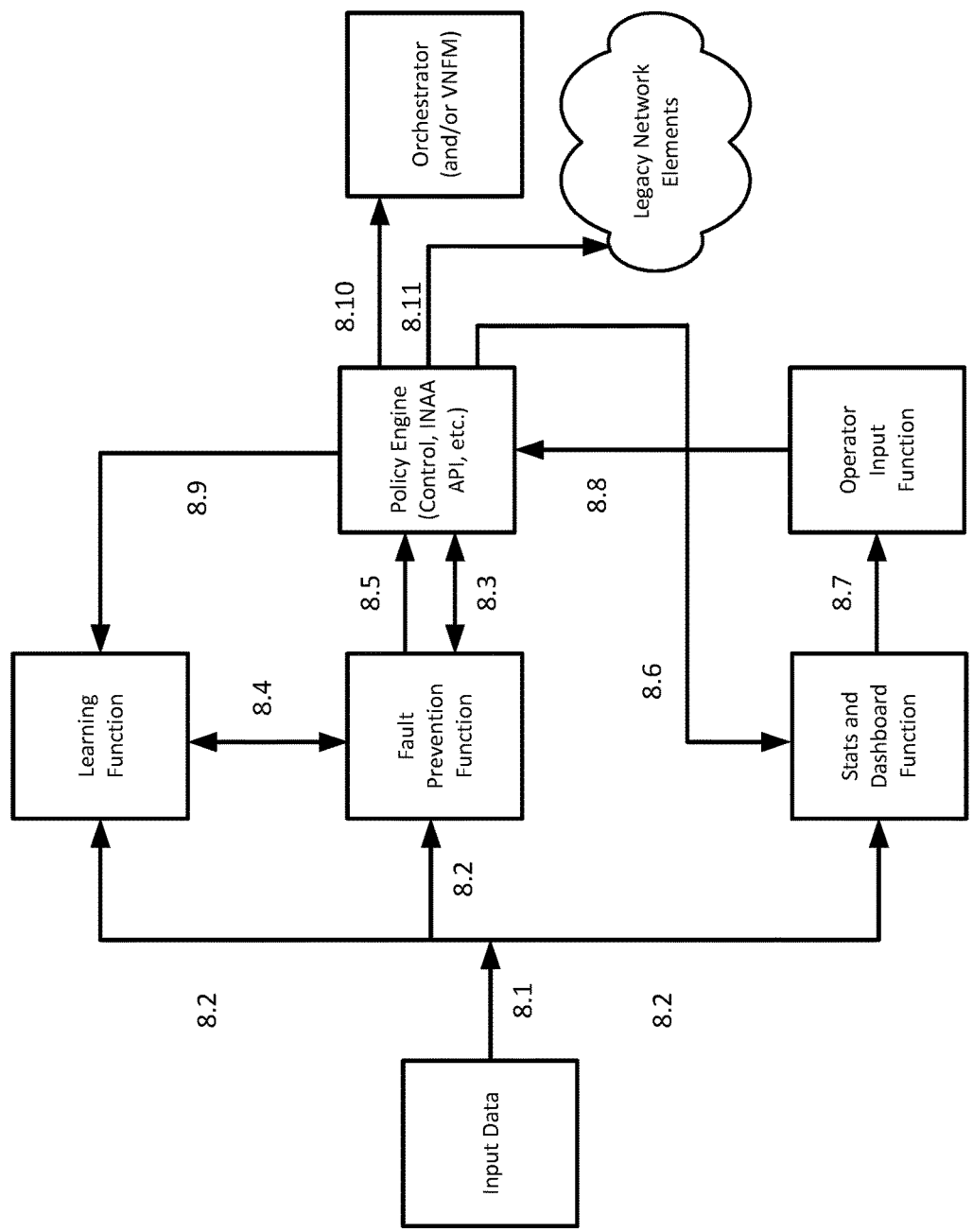
FIG. 8 is a diagram of an example technique for intelligent fault prevention within a network.

FIG. 8 is a diagram of an example technique for intelligent fault prevention within a network. The example technique of FIG. 8 may be implemented by INAA 480. In some implementation, the example technique depicted in FIG. 8 may be implemented in response to a network fault and corresponding correction being determined.

As shown, the example technique may include receiving input data corresponding to a network (at 8.1). Examples of such information may describe particular events, conditions, messages, performance levels, etc. of a network, device, and/or or function (e.g., VNF) of the network. Additionally, or alternatively, the input data may include network topology information, network configuration data, information describing the overall status of the network, etc. In some implementations, the input data may include real-time information, such as current conditions of the network, events that have just occurred within the network, etc. In some implementations, the input data may include polies or rules that were used to identify a fault and or corresponding correction.

The input data may be provided to the fault prevention function, the learning function, and/or the stats and dashboard function (at 8.2). The fault prevention function may use the correction input data to identify other faults that are likely to occur in the network, determine suitable corrections for such faults, and preempt the faults by implementing the determined corrections. The fault prevention function may communicate with the policy engine (at 8.3) and/or the learning function (at 8.4) in order to identify and prevent likely faults. In some implementations, the functionality of the policy engine and the learning function, with respect to the fault prevention function, may be similar to the functionality of these functions with respect to fault detection (as discussed above with reference to FIGS. 6 and 7).

For instance, the fault prevention function may provide some or all of the input data to the policy engine, and the policy engine may return policies that are relevant to identifying and preempting faults in a network environment described by the input data (at 8.3). The policy engine may provide policies that describe how the network, a particular device within the network, and/or a particular function of the network is supposed to operate. Additionally, or alternatively, the policy engine may provide polices for how to identify faults that are likely to occur (e.g., by identifying network conditions similar to those associated with known faults) and/or policies for how to determine an appropriate correction for such faults (e.g., based on the corrections associated with known faults). The learning function may provide the fault prevention function with models and examples of typical operating conditions of the network, in addition to models and examples of how faults have been preemptively corrected in the past.

For instance, an example fault may include a scenario in which a network includes a multi-core network and core network identifiers, provided by UEs, are being improperly interpreted by the network, such that the UEs are often connected to the wrong core network. Additionally, an example correction associated with the fault may indicate that the fault was corrected by modifying the process by which the identifiers were matched to the core networks. Furthermore, the input data may indicate that a new virtual core network (that is associated with a new identifier) has recently been introduced. In light of such information, the policy engine may provide the fault prevention function with information describing how the UEs in the network are to connect to core networks, and the fault prevention function may determine, based on the input data, the example fault and corresponding example correction, and the policy provided by the policy engine, that the process by which identifiers are matched to core networks should be updated in order to avoid a network fault similar (but not the same) as the example network fault.

The fault prevention function may notify the policy engine that a potential fault and/or a correction for the potential fault have been determined (at 8.5), and the policy engine may send the notification to the stats dashboard function via an INAA API (at 8.6). The notification may include the some or all of the information upon which the potential fault and correction were determined (e.g., a description of the potential fault and correction, the example fault and example correction, an indication of the policies used to identify the potential fault and correction, etc.).

Similar to the techniques described above with reference to FIGS. 6 and 7, the status and dashboard function may present the information contained in the notification to an operator of the network. In addition, the status and dashboard function may present some or all of the input data to the operator (in order to, for example, provide the operator with a more complete picture of the network). The operator may provide inputs regarding the information presented by the status and dashboard function (e.g., the operator may validate/invalidate the potential fault, approve/refuse of the implementation of the proposed correction, alter the potential fault or proposed correction, etc.). The status and dashboard function may provide information presented to the operator, along with the operator inputs, to the operator input function (at 8.7), and the operator input function may generate update information based on the information provided. The update information may describe changes to policies managed by the policy engine and/or examples managed by the learning function.

Also similar to the techniques described above with reference to FIGS. 6 and 7, the operator input function may provide the update information to the policy engine, and the policy engine may create a new policy, change an existing policy, or delete an existing policy based on the update information provided by the operator input function. The policy engine may provide the update information to the learning function (at 8.9), and the learning function may create a new example change an existing example, or delete an existing example based on the update information.

The policy engine may also, or alternatively, generate instructions for implementing the proposed (and approved) correction. The policy engine may provide the instructions to the appropriate network device and/or function. For instance, if the correction is to be implemented by a virtual function, the policy engine may provide the instructions to the orchestrator (at 8.10). If the correction is to be implemented by a physical device, the policy engine may provide the instructions to the appropriate device of the Legacy Network Elements network (at 8.11).

Figure 9:
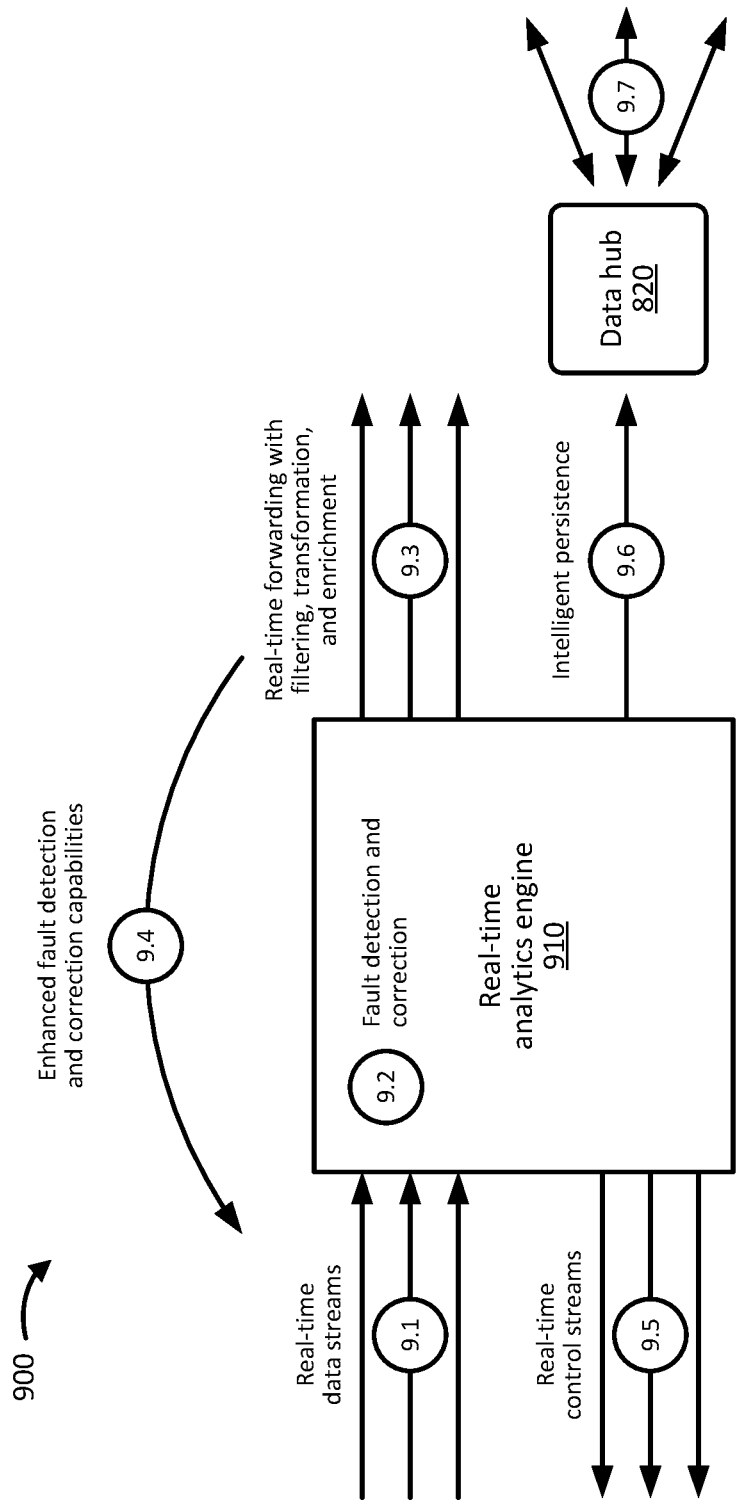
FIG. 9 is a diagram of an example implementation for detecting and correcting network faults in real-time.

FIG. 9 is a diagram of an example implementation 900 for detecting and correcting network faults in real-time. As shown, example implementation may include real-time analytics engine 910 and data hub 920. In some implementations, real-time analytics engine 910 may be capable of performing fault detection, fault correction, and fault prevention operations similar to those discussed above with reference to FIGS. 6-8. In some implementations, real-time analytics engine 910 may be implemented by INAA 480 in addition to, or in lieu of, a fault detection function, a fault correction function, a fault correction prevention function, etc.

Additionally, real-time analytics engine 910 may include a virtual function that is implemented using exceptionally high capacity processors that enable the real-time analytics engine 910 to receive, analyze, modify and forward the data stream in real-time. For example, real-time analytics engine 910 may be implemented using a teraflop processor that may execute at teraflop rates (i.e., a trillion floating point operations per second, $10^{12}$ floating-point operations per second, or 240 flops). As such, real-time analytics engine 910 may perform the operations represented in FIG. 9 in real-time. In some implementations, real-time analytics engine 910 may also, or alternatively, implement real-time messaging and data streaming technologies, such as Kafka, Spark, Storm, Apex, Flink, etc.

Real-time analytics engine 910 may receive multiple data streams (at 9.1). The data streams may include information regarding events and conditions occurring within a network. In some implementations, the data streams may actually be part of processes and operations that are being performed by the network. For instance, the data streams may correspond to an attach procedure between a UE and the network, a handover procedure, etc. As such, the data streams received by real-time analytics engine 910 may not only describe conditions within the network, but may also, or alternatively, be part of ongoing processes and procedures the network.

Real-time analytics engine 910 may analyze the data streams to determine whether one or more faults are occurring in the network. Real-time analytics engine 910 may analyze the data streams in accordance with one or more of the examples provided above with reference to FIG. 6. Additionally, or alternatively, in response to detecting a fault, real-time analytics engine 910 may determine and implement an appropriate correction for the fault (at 9.2). The correction may include, or be similar to, one or more of the examples discussed above with reference to FIG. 7. For instance, the correction may include real-time analytics engine 910 filtering, transforming, enriching (e.g., correcting), etc., the information in the data stream, and still forwarding the information in a manner consistent with real-time (at 9.3).

Real-time analytics engine 910 may continue to monitor, identify faults, and determine corrections for the data stream (at 9.4). Real-time analytics engine 910 may implement one or more learning policy in order to enhance its ability to identify and correct other (e.g., similar) faults in the data stream. Additionally, in response to detecting and correcting the fault, real-time analytics engine 910 may also determine the source of the fault (e.g., the reason why the data stream included the fault) and generate instructions to address the source of the fault. For instance, if the fault was a result of a particular VNF inserting an improper parameter into the data stream, real-time analytics engine 910 may provide instructions to the VNF to, next time, insert an appropriate parameter in the data stream. Real-time analytics engine 910 may be function at such a high rate of speed that the instructions are generated and communicated in real-time.

Real-time analytics engine 910 may also, or alternatively, provide intelligent persistence information to a data hub 820 (at 9.6). The intelligent persistence information may describe the fault that was detected, the correction used to address the fault, the source of the fault, and/or the instructions used to remedy the source of the fault. Intelligent persistence, as described herein, may refer to an ability to evaluate event patterns in real-time and maintain state, while only persisting based on an abstracted view of events (i.e., not persisting based on atomic events). As shown, data hub 820 may communicate the intelligent persistence information to other VNFs of the network (at 9.7) which may enable the fault to be completely eliminated from the network.

In some implementations, real-time analytics engine 910 may also determine faults that may be similar to the fault that was initially detected, determine appropriate corrections for the faults, and include instructions for implementing the corrections at one or more locations within the network. Similar to other operations, real-time analytics engine 910 may perform these operations at such a high rate of speed as to be consistent with real-time, which may help ensure that the faults identified by real-time analytics engine 910 are eliminated from the network before they occur again.

Data hub 820 may include a repository of information corresponding to the creation, discovery, analysis, transformation, and integration of data and metadata at multiple levels of abstraction. Examples of such levels of abstraction may include a model (e.g., of an event or event pattern), metamodels (e.g., a model of a model), meta-metamodels (e.g., a model of a metamodel), etc. Analytical tools, such as graph theory tools, may be applied to the abstracted data and metadata to separate objects, from relationships between objects, in order to discover and capture relationships of significance. Data hub 820 may receive intelligent persistence information (e.g., models, metamodels, etc.) and make intelligent persistence information available to other real-time analytics engines with the network.

FIG. 10 is a diagram of example components of a device 1000. Each of the devices illustrated in FIGS. 2 and 3 may include one or more devices 1000. Device 1000 may include bus 1010, processor 1020, memory 1030, input component 1040, output component 1050, and communication interface 1060. In another implementation, device 1000 may include additional, fewer, different, or differently arranged components. As described herein, a component may be implemented by hardware circuitry, software logic, and/or some combination thereof.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes (LEDs), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1320 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 1 and 4-9 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A server device, comprising:
 a non-transitory memory device storing a plurality of processor-executable instructions; and
 a processor configured to execute the processor-executable instructions, wherein executing the processor-executable instructions causes the processor to:
  receive information corresponding to a condition occurring within a wireless telecommunication network;
  detect, based on the information, a fault occurring within the wireless telecommunication network by comparing the information to policies that include explicit rules about how the wireless telecommunication network is to operate and comparing the information to models of the wireless telecommunication network operating normally without the fault;
  determine a correction to the fault based on the policies and the models, the correction including a change in a configuration of a particular network device of the wireless telecommunication network;
  notify, an operator of the network, regarding the fault and the correction to the fault;
  receive, from the operator, a confirmation of the fault and the correction to the fault;
  update the policies in accordance with the correction; and
  implement the correction within the wireless telecommunication network by updating the particular network device according to the change in configuration.

2. The server device of claim 1, wherein the server device and the particular network device of the wireless telecommunication network each comprise a virtual function hosted by one or more physical server devices.

3. The server device of claim 1, wherein the processor-executable instructions cause the processor to:
 identify, based on the particular network device, other network devices within the wireless telecommunication network to which the correction applies, and
 apply the correction to the other network devices.

4. The server device of claim 1, wherein the processor-executable instructions cause the processor to:
 receive, after applying the correction, performance information corresponding to the particular network device; and
 determine, based on the performance information, whether the correction is effective.

5. The server device of claim 1, wherein the processor-executable instructions causes the processor to:
 prevent similar faults from occurring in the wireless telecommunication network by:
  identifying, based on the fault, potential faults within the network,
  determining preemptive corrections to the potential faults based on the policies and models, and
  applying the preemptive corrections to the wireless telecommunications network.

6. The server device of claim 1, wherein the fault is detected and the correction is determined and implemented, in real-time.

7. The server device of claim 6, wherein the correction is propagated in multiple locations throughout the wireless telecommunication network in real-time.

8. A method, comprising:
 receiving, by a server device, information corresponding to a condition occurring within a wireless telecommunication network;
 detecting, by the server device and based on the information, a fault occurring within the wireless telecommunication network by comparing the information to policies that include explicit rules about how the wireless telecommunication network is to operate and models of the wireless telecommunication network operating normally without the fault;
 determining, by the server device, a correction to the fault based on the policies and the models, the correction including a change in a configuration of a particular network device of the wireless telecommunication network;
 notifying, by the server device, an operator of the network, regarding the fault and the correction to the fault;
 receiving, by the server device and from the operator, a confirmation of the fault and the correction to the fault;
 updating, by the server device, the policies in accordance with the correction; and implementing, by the server device, the correction within the wireless telecommunication network by updating the particular network device according to the change in configuration.

9. The method of claim 8, wherein the server device and the particular network device of the wireless telecommunication network each comprise a virtual function hosted by one or more physical server devices.

10. The method of claim 8, further comprising:
identifying, based on the particular network device, other network devices within the wireless telecommunication network to which the correction applies, and
applying the correction to the other network devices.

11. The method of claim 8, further comprising:
receiving, after applying the correction, performance information corresponding to the particular network device; and
determining, based on the performance information, whether the correction is effective.

12. The method of claim 8, further comprising:
preventing similar faults from occurring in the wireless telecommunication network by:
identifying, based on the fault, potential faults within the network,
determining preemptive corrections to the potential faults based on the policies and models, and
applying the preemptive corrections to the wireless telecommunications network.

13. The method of claim 8, wherein the fault is detected and the correction is determined and implemented, in real-time.

14. The method of claim 13, wherein the correction is propagated in multiple locations throughout the wireless telecommunication network in real-time.

15. A non-transitory, computer readable medium storing a plurality of processor-executable instructions, wherein executing the processor-executable instructions causes one or more processors to:
receive information corresponding to a condition occurring within a wireless telecommunication network;
detect, based on the information, a fault occurring within the wireless telecommunication network by comparing the information to policies that include explicit rules about how the wireless telecommunication network is to operate and models of the wireless telecommunication network operating normally without the fault;
determine a correction to the fault based on the policies and the examples, the correction including a change in a configuration of a particular network device of the wireless telecommunication network;
notify, an operator of the network, regarding the fault and the correction to the fault;
receive, from the operator, a confirmation of the fault and the correction to the fault;
update the policies in accordance with the correction; and
implement the correction within the wireless telecommunication network by updating the particular network device according to the change in configuration.

16. The non-transitory memory device of claim 15, wherein the server device and the particular network device of the wireless telecommunication network each comprise a virtual function hosted by one or more physical server devices.

17. The non-transitory memory device of claim 15, wherein the processor-executable instructions cause the one or more processors to:
identify, based on the particular network device, other network devices within the wireless telecommunication network to which the correction applies, and
apply the correction to the other network devices.

18. The non-transitory memory device of claim 15, wherein the processor-executable instructions cause the one or more processors to:
receive, after applying the correction, performance information corresponding to the particular network device; and
determine, based on the performance information, whether the correction is effective.

19. The non-transitory memory device of claim 15, wherein the processor-executable instructions cause the one or more processors to:
prevent similar faults from occurring in the wireless telecommunication network by:
identifying, based on the fault, potential faults within the network,
determining preemptive corrections to the potential faults based on the policies and models, and
applying the preemptive corrections to the wireless telecommunications network.

20. The non-transitory memory device of claim 15, wherein the fault is detected and the correction is determined and implemented, in real-time.

* * * * *